US012584338B2

(12) United States Patent
Wang

(10) Patent No.: US 12,584,338 B2
(45) Date of Patent: Mar. 24, 2026

(54) STACKING SCREEN DOOR

(71) Applicants: Wei-Chao Wang, New Taipei City (TW); Luxtech Design LLC., New York, NY (US)

(72) Inventor: Wei-Chao Wang, New Taipei City (TW)

(73) Assignees: LUXTECH DESIGN LLC., Flushing, NY (US); Wei-Chao Wang, New Taipei City (TW)

( * ) Notice: Subject to any disclaimer, the term of this patent is extended or adjusted under 35 U.S.C. 154(b) by 12 days.

(21) Appl. No.: 18/735,476

(22) Filed: Jun. 6, 2024

(65) Prior Publication Data

US 2025/0376891 A1 Dec. 11, 2025

(51) Int. Cl.

*E06B 9/24* (2006.01)
*E05D 15/22* (2006.01)
*E06B 3/92* (2006.01)

(52) U.S. Cl.

CPC ........ *E05D 15/22* (2013.01); *E05D 2015/225* (2013.01); *E05Y 2900/106* (2013.01); *E06B 3/927* (2013.01); *E06B 2009/247* (2013.01)

(58) Field of Classification Search

CPC ..... E06B 2009/2452; E06B 2009/2458; E06B 2009/247; E06B 3/925–927; E06B 1/12–16; E06B 1/26–30; E06B 1/32–325; E06B 1/52–522; E06B 1/528; E06B 3/485; G09F 9/3026; E05Y 2400/656–658; H02G 11/00–006

See application file for complete search history.

(56) References Cited

U.S. PATENT DOCUMENTS 3,732,913 A * 5/1973 Wrono ................ E06B 9/17061 160/133
6,039,390 A * 3/2000 Agrawal ........... G02F 1/133308 296/211
8,643,933 B2 * 2/2014 Brown .................... G02F 1/153 359/275

(Continued)

FOREIGN PATENT DOCUMENTS

CN 114120846 A * 3/2022 ........... G09F 9/3026
EP 1571281 A2 * 9/2005 ............. E06B 1/522

(Continued)

*Primary Examiner* — Catherine A Kelly
*Assistant Examiner* — Patrick B. Ponciano
(74) *Attorney, Agent, or Firm* — MUNCY, GEISSLER, OLDS & LOWE, P.C.

(57) ABSTRACT

A stacking screen door has two rails and multiple door panels. Each one of the rails has a groove, a conductive bar, and an elastic assembly. The conductive bar is movably located in the groove. The elastic assembly is connected to the conductive bar and the groove, and is configured to push the conductive bar out of the groove. The door panels selectively move along the two rails and are sequentially connected vertically to each other in the rail. Each one of the door panels has two electric assemblies and multiple display screens. Each one of the display screens is electrically connected to the two electric assemblies. When each one of the door panels moves along the two rails, each one of electric assemblies is respectively connected to the conductive bar. Therefore, power can be supplied to the display screens.

10 Claims, 9 Drawing Sheets

(56) References Cited

U.S. PATENT DOCUMENTS

| | | | | | |
|---|---|---|---|---|---|
| 10,180,606 | B2 * | 1/2019 | Mullins | .................. | H01R 25/14 |
| 2018/0230732 | A1 * | 8/2018 | Tseng | ...................... | E04H 9/145 |
| 2022/0205315 | A1 * | 6/2022 | Hall | ........................ | E06B 9/322 |

FOREIGN PATENT DOCUMENTS

| | | | | | | |
|---|---|---|---|---|---|---|
| GB | 2589537 | A | * | 6/2021 | ........... | E06B 3/4415 |
| KR | 1020180057252 | | | 5/2018 | | |
| TW | M569050 | | | 10/2018 | | |
| WO | 2017217679 | | | 12/2017 | | |
| WO | WO-2024196356 | A1 | * | 9/2024 | ............ | E05F 15/668 |
| WO | WO-2024196362 | A1 | * | 9/2024 | ............. | E06B 3/485 |

* cited by examiner

STACKING SCREEN DOOR

BACKGROUND OF THE INVENTION

1. Field of the Invention

The present invention relates to a stacking door, especially to a stacking electric door comprising display screens.

2. Description of the Prior Arts

Stacking doors can be mounted in various places, such as schools, stores, or even garages, and are configured to divide areas into sub-areas. In general, the stacking door comprises multiple door panels, two rails, and a storage area. When the stacking door is open, the door panels are separated from each other and arranged in the storage area; when the stacking door is closed, the door panels move along the rails, and connect vertically to form a wall.

Nowadays, a stacking screen door is provided, which is equipped with display screens on each one of the door panels, and each one of the door panels respectively comprises electric assemblies. The electric assemblies are connected to each one of the door panels, and carry out signal transmission. Therefore, the door panels form a large screen, which can be used for multimedia purposes such as showing videos or advertisements.

However, during the descent of the stacking screen door or when the stacking screen door is only partially descending, the electric assemblies are not fully connected, and the signals cannot be transmitted at that time, so the display screen cannot be used. In addition, if the electric assembly at the top of the stacking screen door or in the middle of the stacking screen door is broken, the other door panels below the faulty electric assembly will not be able to receive signals. If there are multiple door panels with faulty electric assemblies at the same time, it will take more time and effort to find the faulty door panels for repair.

To overcome the shortcomings, the present invention provides a stacking screen door to mitigate or obviate the aforementioned problems.

SUMMARY OF THE INVENTION

The main objective of the present invention is to provide a stacking screen door that is capable of energizing the display screen on the door even when only part of the door panels of the door is descended.

The stacking screen door comprises a storage area, a driving assembly, two rails, and multiple door panels. The driving assembly is located in the storage area.

The two rails are respectively mounted on the two sides underneath the storage area and configured to extend from the storage area to the ground level. One of the rails comprises two grooves, two conductive bars, and two elastic assemblies. The two grooves are configured to extend from the storage area to the ground level and is parallel to the other one of the rails. The two conductive bars are each movably located in one of the grooves and are configured to extend from the storage area to the ground level. Each one of the elastic assemblies is connected to one of the conductive bars and one of the grooves, and the two elastic assemblies are configured to push the conductive bars out of the groove. Each one of the elastic assemblies includes multiple springs, two ends of each one of the springs are respectively connected to the corresponding conductive bar and the corresponding groove, and each one of the conductive bars is connected to the multiple springs.

The door panels are connected to the driving assembly. The door panels are selectively mounted in the storage area. The door panels selectively move along the two rails and are connected vertically to each other in the two rails. Each one of the door panels comprises two electric assemblies and multiple display screens. The two electric assemblies are respectively located on a same end of the door panel. The multiple display screens are respectively mounted on the door panels, and each one of the display screens is electrically connected to the two electric assemblies. When each one of the door panels moves along the two rails, each one of the electric assemblies is respectively connected to the conductive bar.

The advantage of the present invention is that as soon as one single door panel enters the rail, the display screens on the door panel can receive electrical energy, no need to wait for the stacking screen door to close completely. In addition, since each one of door panels is an independent circuit, when the electric assembly of one of the door panels is broken, the operation of the display screens of the other door panels remains unaffected.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
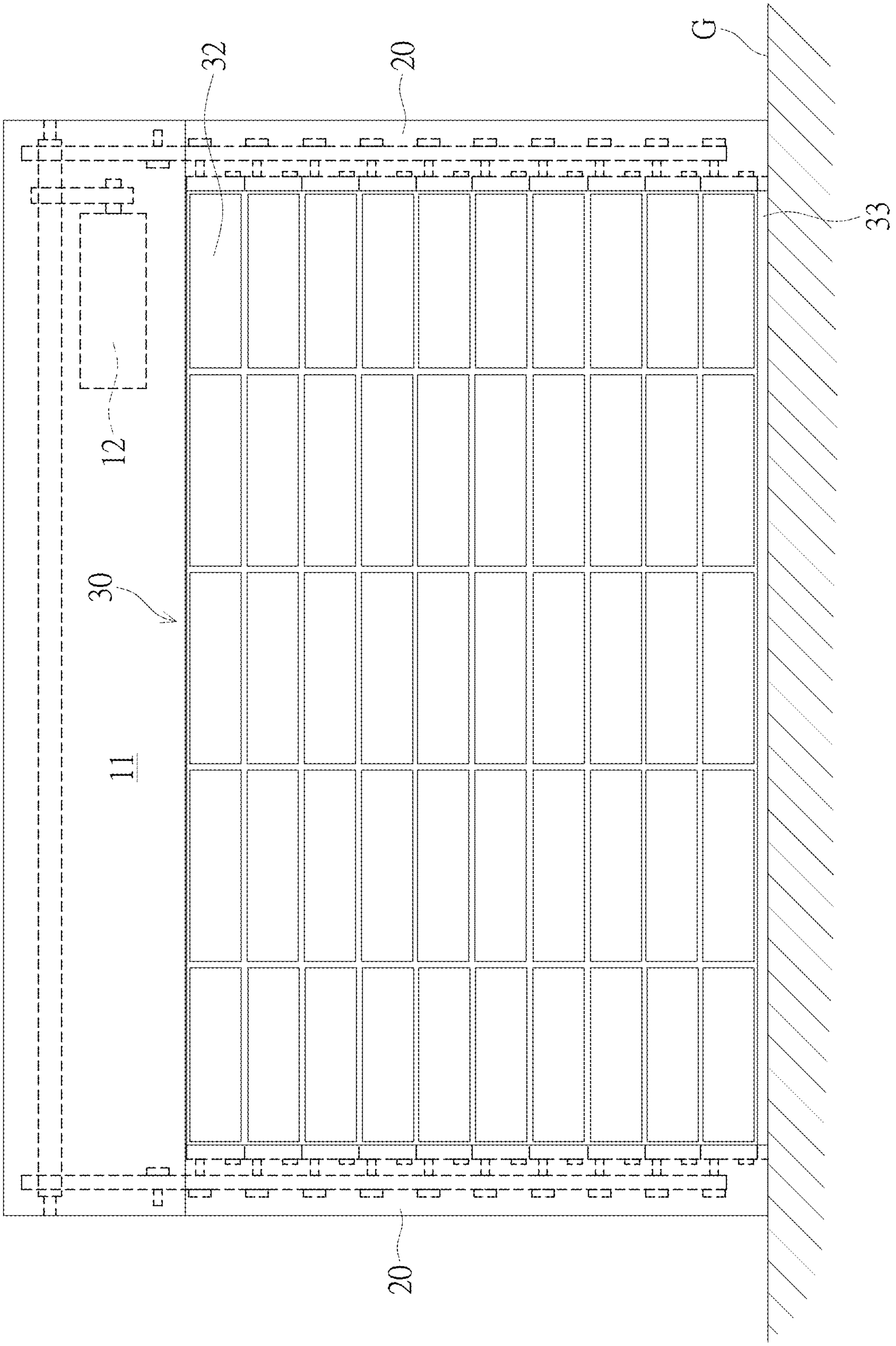
FIG. 1 is a front view of a stacking screen door in accordance with the present invention.
Figure 2:
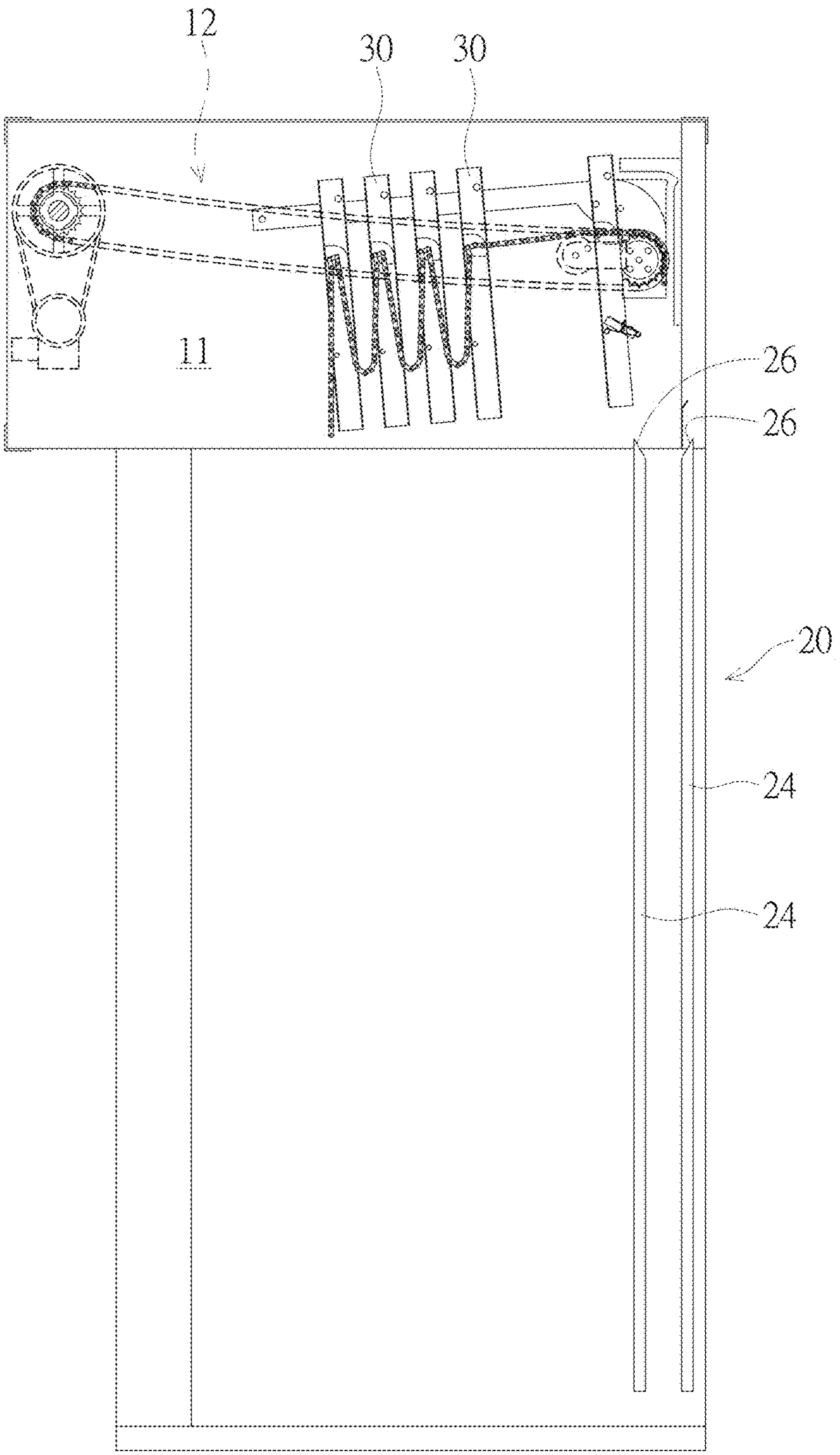
FIG. 2 is a side view of the stacking screen door in FIG. 1 when the stacking screen door is open.
Figure 3:
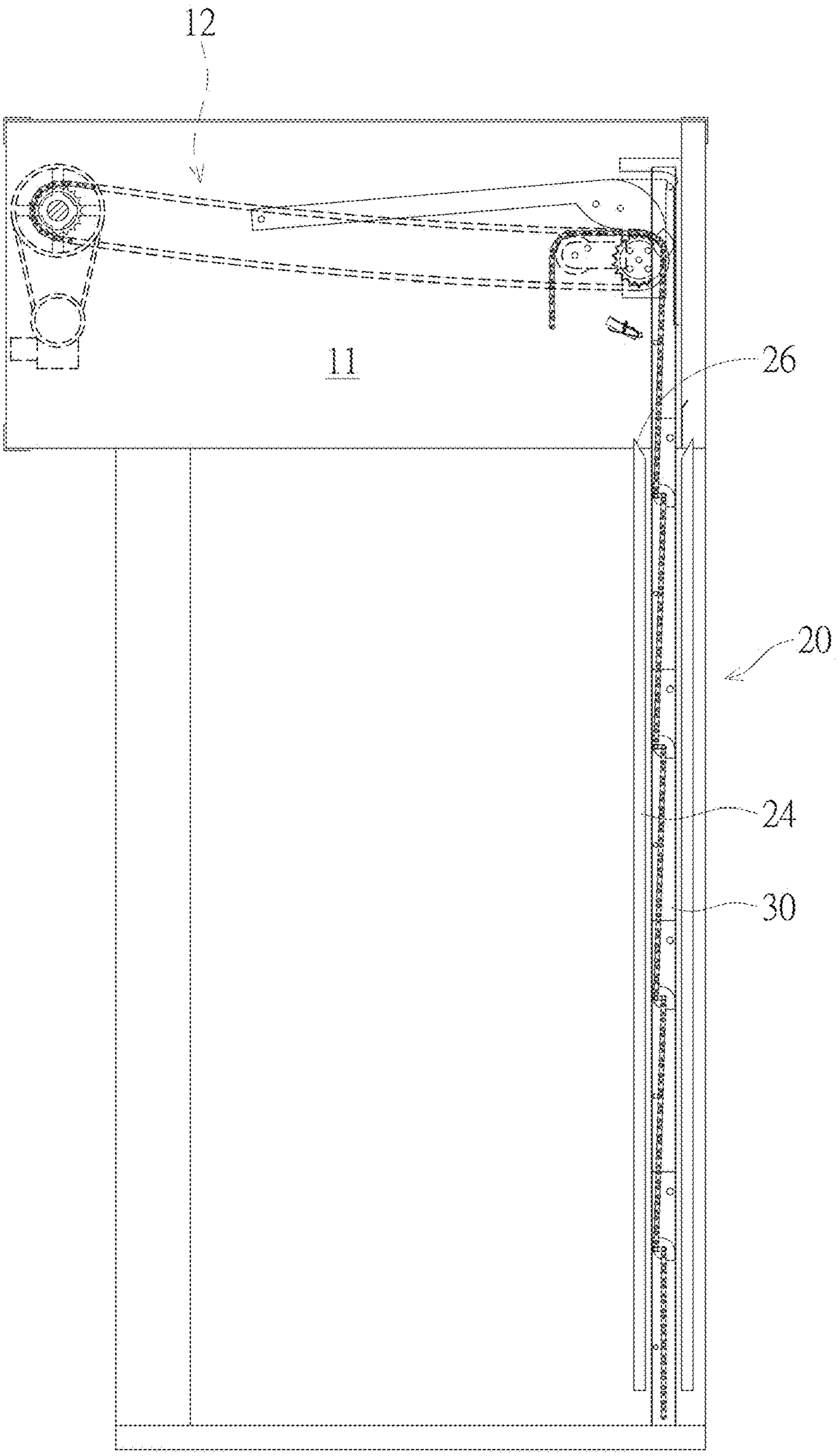
FIG. 3 is a side view of the stacking screen door in FIG. 1 when the stacking screen door is closed.

With reference to FIG. 1 to FIG. 3, the present invention provides a stacking screen door. The stacking screen door comprises a storage area 11, a driving assembly 12, two rails 20 and multiple door panels 30. The storage area 11 is located on the top of the stacking screen door. The driving assembly 12 is mounted in the storage area 11 and configured to control the opening and closing of the stacking screen door.

Figure 4:
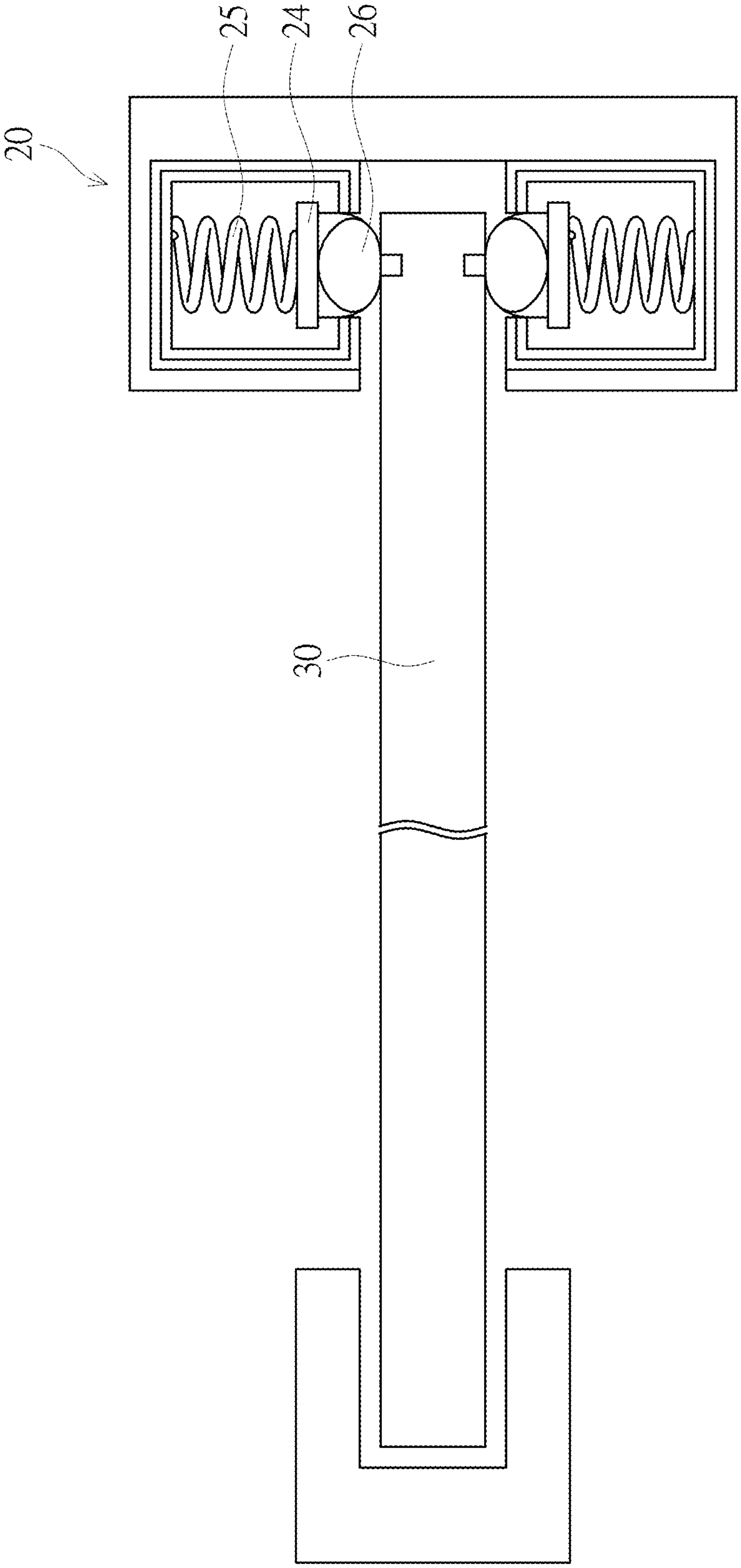
FIG. 4 is a top view of two rails and a door panel in FIG. 1.
Figure 5:
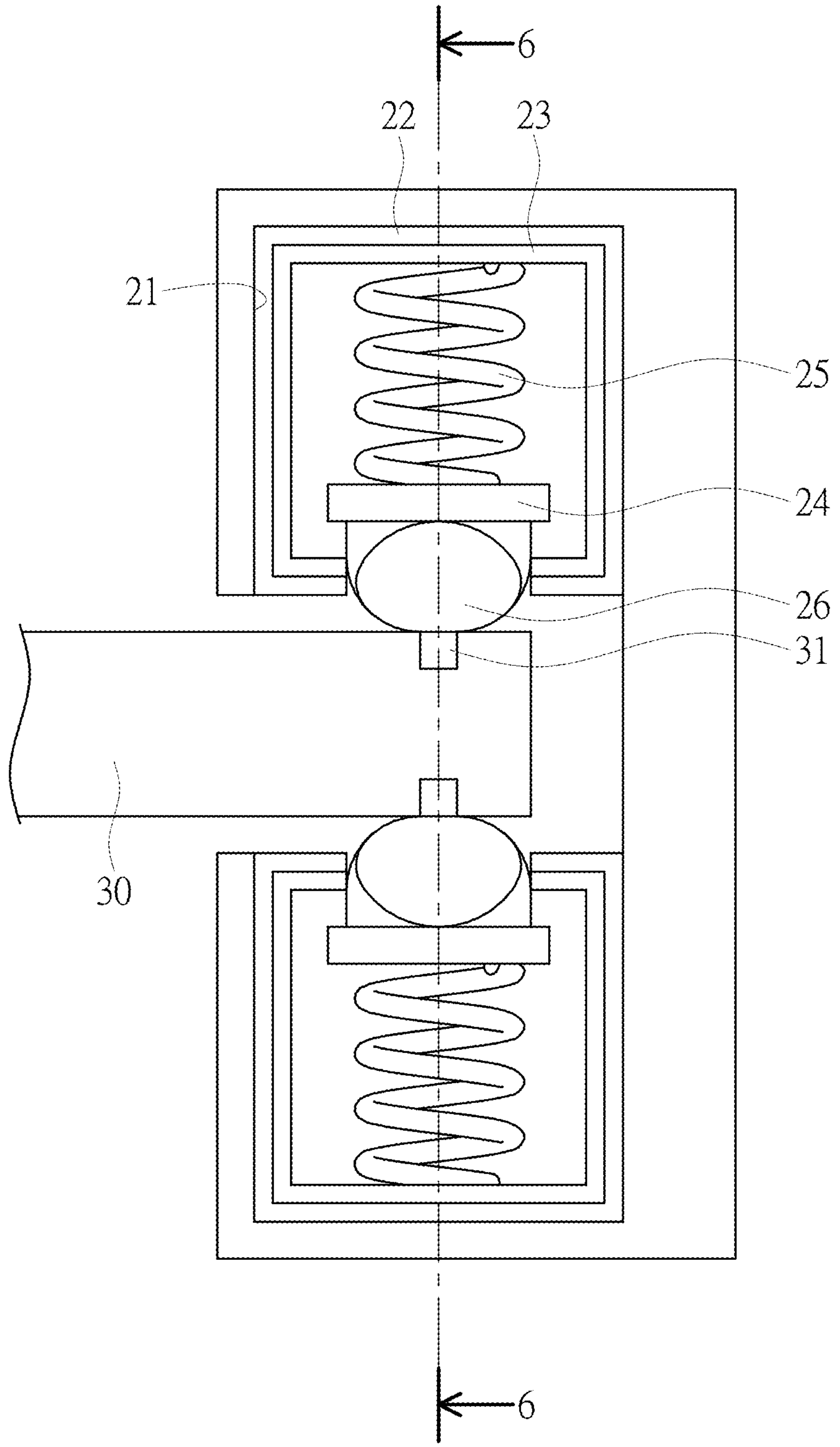
FIG. 5 is a partial enlargement view of the rail and the door panel in FIG. 1.
Figure 6:
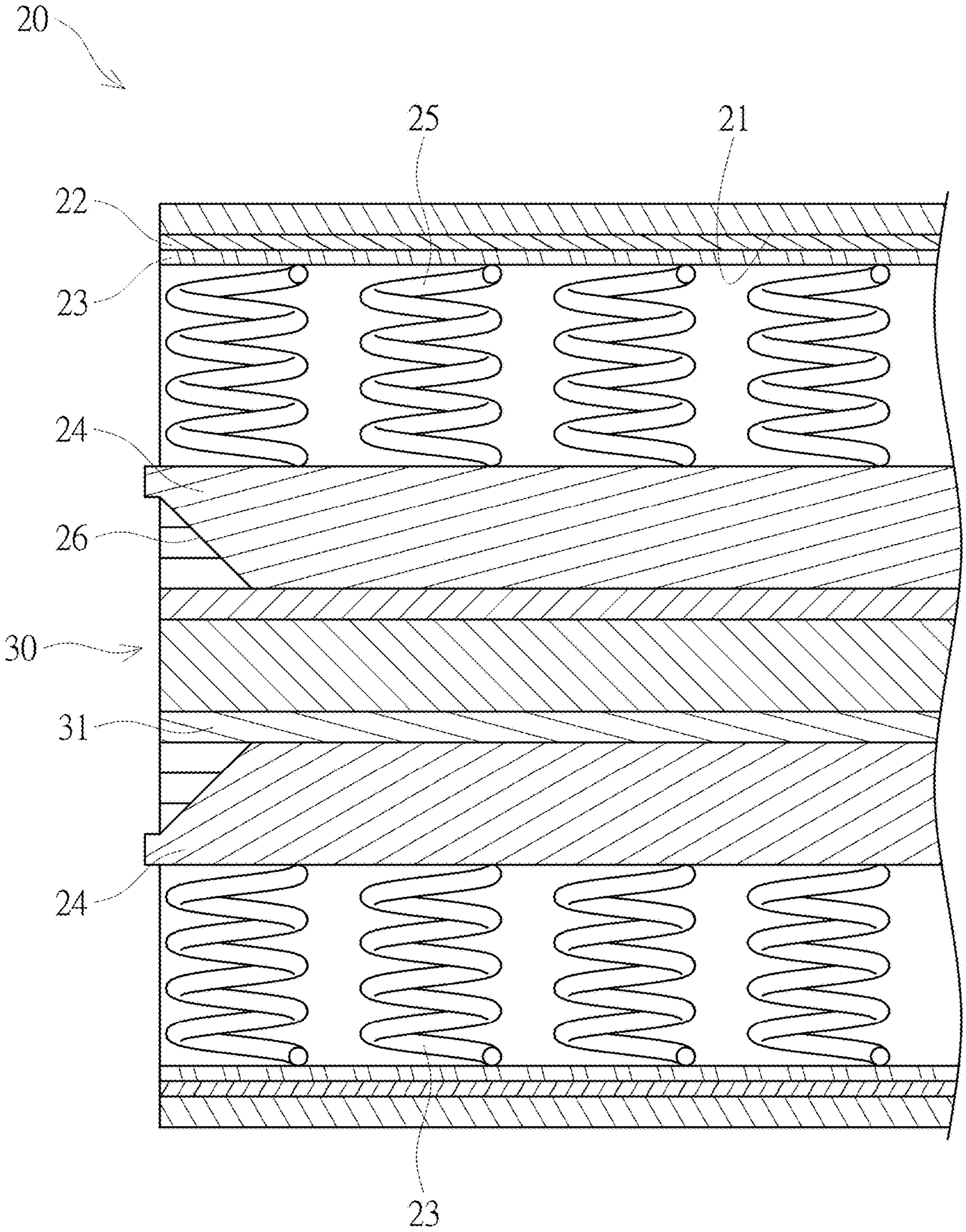
FIG. 6 is a cross-sectional view of the rail and the door panel across the section line 6-6 in FIG. 5.

Then please refer to FIG. 4 to FIG. 6. The two rails 20 are respectively mounted on two sides underneath the storage area 11 and extend from the storage area 11 to the ground level. In this embodiment, one of the rails 20 comprises two grooves 21, two conductive bars 24, two insulation layers 22, two metal layers 23, two elastic assemblies 25, and two inclines 26. The openings of the two grooves 21 are opposite to each other so that the conductive bars 24 protrude towards each other. The two conductive bars 24 are connected to the same electrode of the power supply. In another embodiment, the two rails 20 both comprise two conductive bars 24. The two conductive bars 24 of one of the rails 20 are both connected to the positive electrode of the power supply, and the two conductive bars 24 of the other rail 20 are both connected to the negative electrode of the power supply. Each one of the two rails 20 comprises a conductive bar 24, and the two rails 20 are respectively connected to the positive electrode and the negative electrode of the power supply.

The grooves 21, the insulation layers 22, the metal layers 23, and the conductive bars 24 are all according to FIG. 4, FIG. 5, and line eighth to twentieth of Page 5 of the referenced patent application as originally filed extend from the storage area 11 to the ground level and are parallel to the rail 20. The insulation layers 22 and the metal layers 23 are both mounted in the grooves 21, precisely the insulation layers 22 cover the inner surface of the grooves 21, and the metal layers 23 cover the insulation layers 22.

The conductive bars 24 and the elastic assemblies 25 are mounted in the grooves 21. In other words, the grooves 21 surround the conductive bars 24 and the elastic assemblies 25. In this embodiment, the insulation layers 22 and the metal layers 23 also surround the conductive bars 24 and the elastic assemblies 25. The rail 20 consists of the grooves 21, the insulation layers 22, the metal layers 23, the conductive bars 24 and the elastic assemblies 25 in order from outside to inside. Each one of the grooves 21 comprises an opening, and the elastic assemblies 25 are configured to push the conductive bars 24 out from the opening of the grooves 21.

Figure 7:
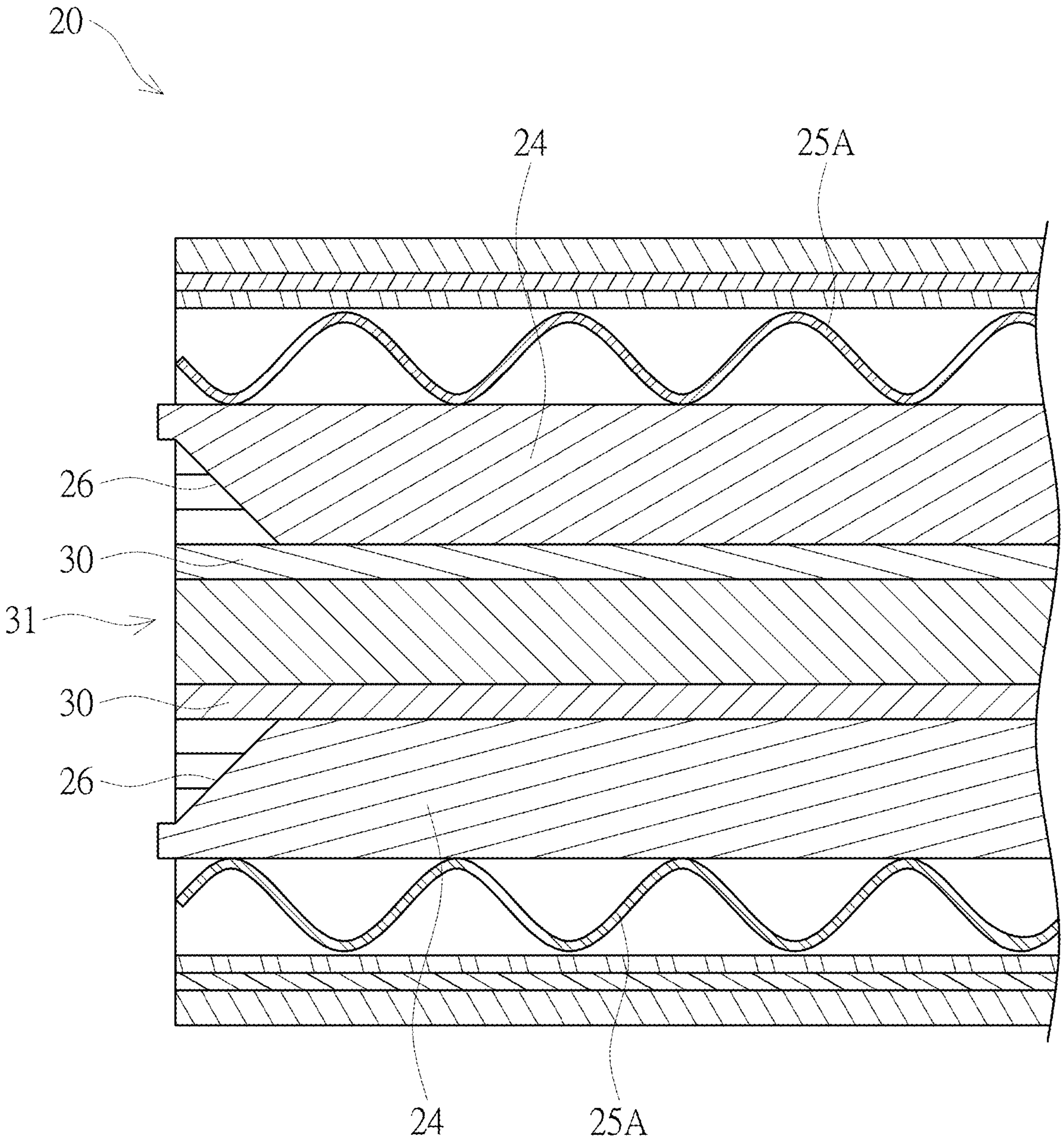
FIG. 7 is a cross-sectional view of the rail and the door panel in another embodiment in FIG. 1.

With reference to FIG. 6, in this embodiment, each one of the elastic assemblies 25 can be multiple springs. The springs are arranged in parallel from top to bottom along one of the conductive bars 24, and the two ends of the spring are connected to the conductive bar 24 and the metal layer 23 respectively. Each one of the conductive bars 24 is connected to the multiple springs. In another embodiment, with reference to FIG. 7, the elastic assembly 25A comprises a wave structure comprising multiple peaks and multiple troughs. The peaks and the troughs are arranged staggered, the peaks are connected to the conductive bar 24, and the troughs are connected to the metal layer 23. The structure of the elastic assembly 25 is not limited to the above description, as long as the elastic assembly 25 is configured to push the conductor bar 24 out of the groove 21.

Then please refer to FIG. 2, FIG. 5, and FIG. 6. The inclines 26 are located at one end of the rail 20 near the storage area 11. In other words, the groove 21, the conductive bar 24, the insulation layer 22 and the metal layer 23 can also comprise the inclines 26. In this embodiment, the inclines 26 are formed on the tops of the conductive bars 24, and precisely the inclines 26 on the two conductive bars 24 in the same rail 20 are inclined downward toward each other.

Figure 8:
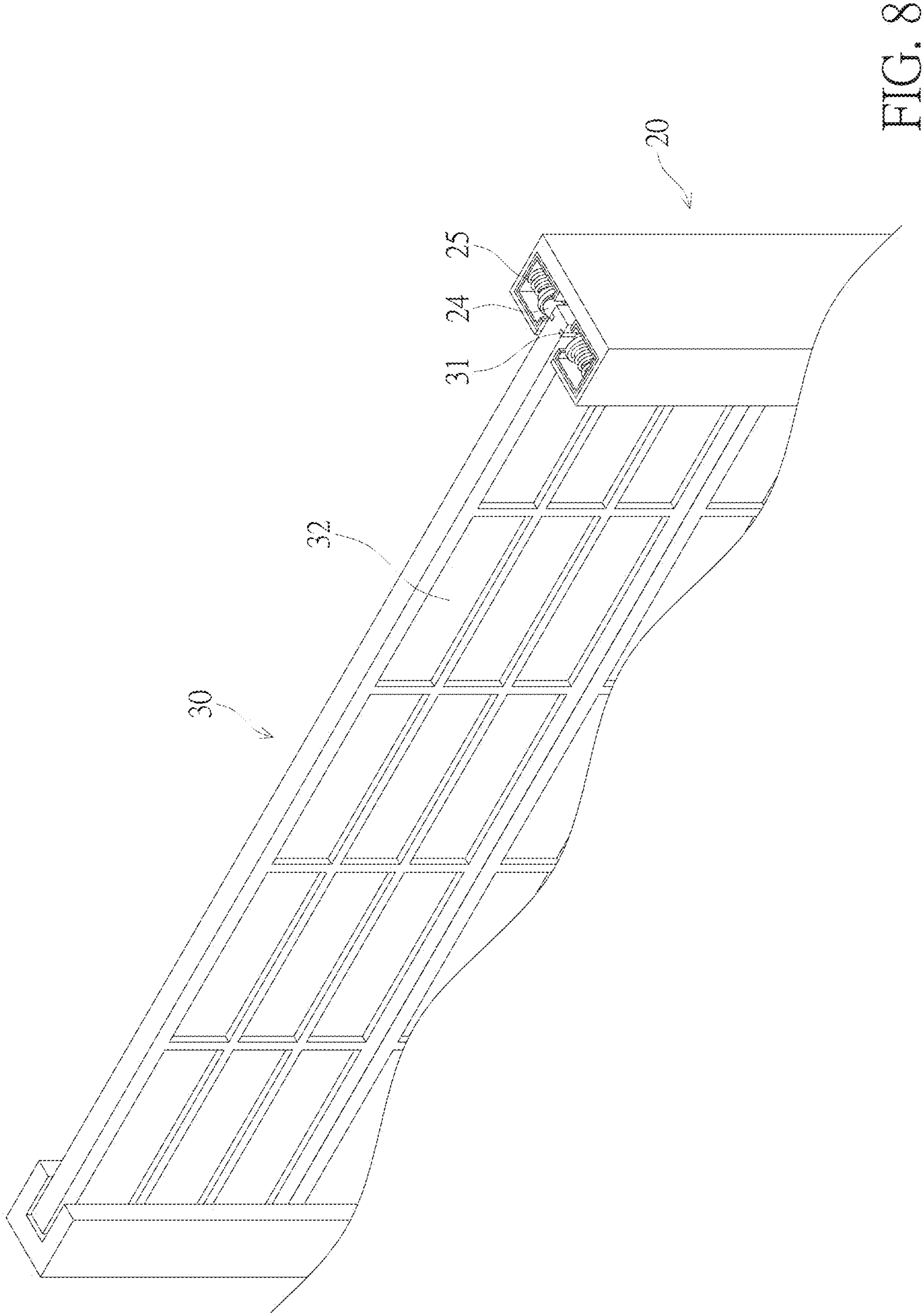
FIG. 8 is a perspective view of the rails and the door panels in FIG. 1.
Figure 9:
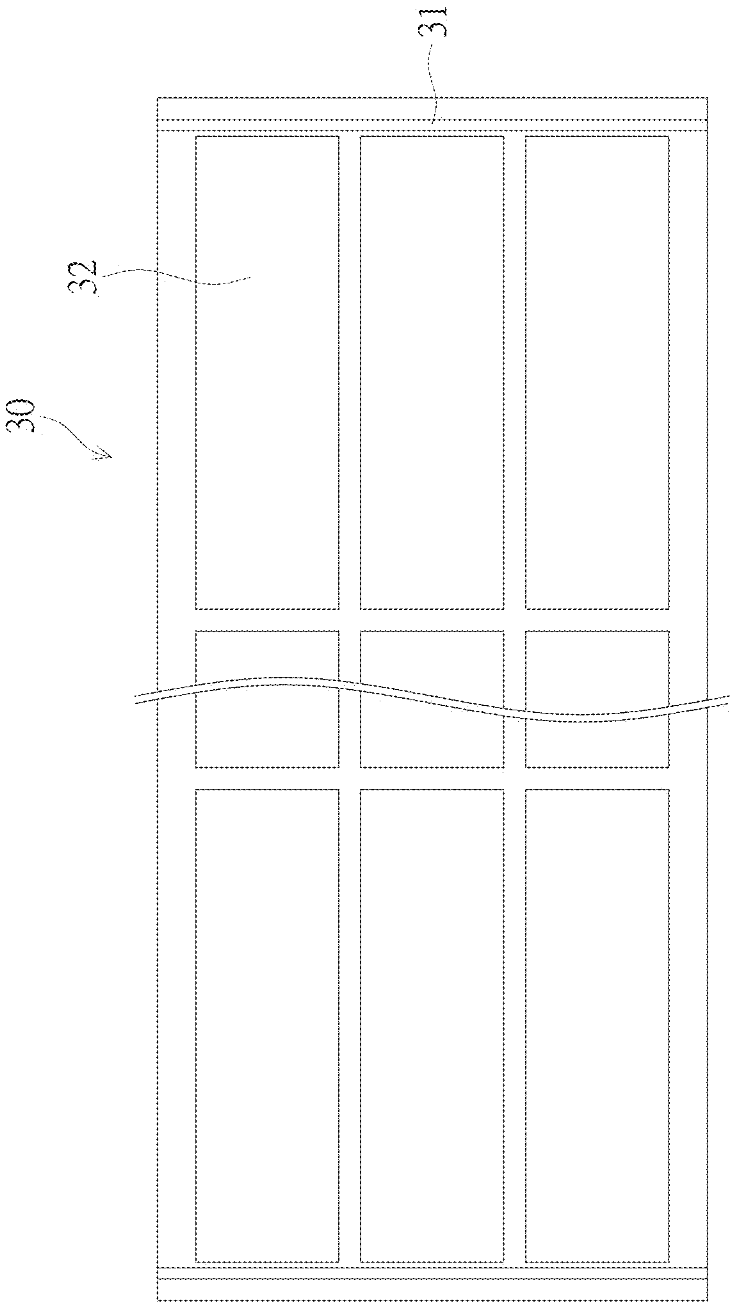
FIG. 9 is a front view of the door panel in FIG. 1.

Then please refer to FIG. 2, FIG. 8, and FIG. 9. The door panels 30 are connected to the driving assembly 12 and controlled by the driving assembly 12. When the stacking screen door is open, the door panels 30 can be arranged in a row in the storage area 11. When the stacking screen door is closed, the door panels 30 move downward along the rail 20, and each one of the door panels 30 is sequentially connected vertically to each other and extends from the storage area 11 to the ground level. Each one of the door panels 30 can comprise two electric assemblies 31, multiple display screens 32, and a base 33.

The electric assembly 31 corresponds in position to the conductive bar 24, such that the electric assembly 31 can contact the conductive bar 24 when the door panel 30 is located in the rail 20 and form an electrical connection for supplying electrical energy. The two electric assemblies 31 can be located at the two ends of the door panel 30 or at the same end of the door panel 30, depending on the locations of the conductive bars 24. In this embodiment, there are four electric assemblies 31 in total. Either end of the door panel 30 is provided with two electric assemblies 31, and the two electric assemblies 31 are located on front and back, respectively. Therefore, each one of the electric assemblies 31 can respectively contact one of the conductive bars 24.

Each one of the door panels 30 can be a board, the display screens 32 are arranged on the board, and thereby the display screens 32 of the door panels 30 are connected to form a big screen when the stacking screen door is closing. In another embodiment, each one of the door panels 30 can comprise multiple boards, the boards are arranged in connection with each other, and each one of the boards comprises a respective display screen 32. The display screens 32 are electrically connected to the electric assemblies 31, so that the electrical energy is supplied to the display screen 32 through the conductive bars 24 and the electric assemblies 31.

The base 33 is mounted on the bottom of a lowermost one of the door panels 30, thereby providing a cushion to protect the door panels 30 when all the door panels are descended.

Then please refer to FIG. 1, FIG. 2, and FIG. 6. When the stacking screen door is closed, the door panels 30 sequentially enter the rails 20 along the inclines 26 from the storage area 11. Through the guidance of the incline 26, each door panel 30 can smoothly enter the rail 20 without being stuck on another door panel 30. After the door panel 30 enters the rail 20, the electric assemblies 31 are connected to the conductive bars 24. Electrical signals flow from the conductive bar 24 through the electric assembly 31, the display screen 32, another electric assembly 31, and arrive at another conductive bar 24. In other words, each one of the door panels 30 can form a loop with the conductive bars 24 as soon as entering the rail 20.

The advantage of the present invention is that as soon as any one single door panel 30 enters the rail 20, the display screens 32 on the door panel 30 can receive electrical energy, no need to wait for the stacking screen door to close completely. In addition, since each one of the door panels 30 is an independent circuit, when the electric assembly 31 of one door panel 30 is broken, the operation of the display screens 32 of the other door panels 30 remains unaffected.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stacking screen door comprising:

a storage area;

a driving assembly located in the storage area;

two rails respectively mounted on two sides underneath the storage area and configured to extend from the storage area to a ground level, and one of the rails comprising:

two grooves configured to extend from the storage area to the ground level and being parallel to the other one of the rails;

two conductive bars each movably located in respective one of the grooves, and configured to extend from the storage area to the ground level; and two elastic assemblies, each one of the elastic assemblies connected to respective one of the grooves and respective one of the two conductive bars, and the elastic assemblies configured to push the conductive bars out of the grooves; each one of the elastic assemblies including multiple springs, two ends of each one of the springs respectively connected to the corresponding conductive bar and the corresponding groove, and each one of the conductive bars connected to the multiple springs;

multiple door panels connected to the driving assembly; the door panels selectively mounted in the storage area; the door panels selectively moving along the two rails, and connected vertically to each other in the two rails; each one of the door panels comprising:

two electric assemblies located on a same end of the door panel; and multiple display screens respectively mounted on the door panel, each one of the display screens electrically connected to the two electric assemblies;

wherein, when each one of the door panels moves along the two rails, the two electric assemblies are each respectively connected to the two conductive bars.

2. The stacking screen door as claimed in claim 1, wherein, each one of the grooves comprises an opening, and the conductive bars protrude from the openings of the grooves.

3. The stacking screen door as claimed in claim 2, wherein said one of the two rails comprises:

two insulation layers, each one of the two insulation layers located between one of the elastic assemblies and one of the grooves and surrounding the one of conductive bars and one of the elastic assemblies; and two metal layers, each one of the two metal layers located between one of the elastic assemblies and one of the insulation layers and surrounding one of the conductive bars and one of the elastic assemblies; the two metal layers electrically connected to the conductive bars.

4. The stacking screen door as claimed in claim 3, wherein, the door panel comprises multiple boards, the boards are connected to each other, and each one of the boards comprises a respective one of the display screens.

5. The stacking screen door as claimed in claim 4, wherein, said one of the two rails comprises two inclines near an end of the storage area; when the door panels move between the storage area and the two rails, the door panels enter or leave the two rails along the inclines; wherein, the two inclines are formed on tops of the conductive bars.

6. The stacking screen door as claimed in claim 5, further comprising a base, the base mounted on a bottom of a lowermost one of the door panels.

7. The stacking screen door as claimed in claim 1, wherein said one of the two rails comprises:

two insulation layers, each one of the two insulation layers located between one of the elastic assemblies and one of the grooves and surrounding the one of conductive bars and one of the elastic assemblies; and two metal layers, each one of the two metal layers located between one of the elastic assemblies and the insulation layers and surrounding one of the conductive bars and one of the elastic assemblies; the two metal layers electrically connected to the conductive bars.

8. The stacking screen door as claimed in claim 1, wherein, the door panel comprises multiple boards, the boards are connected to each other, and each one of the boards comprises a respective one of the display screens.

9. The stacking screen door as claimed in claim 1, wherein, said one of the two rails comprises two inclines near an end of the storage area; when the door panels move between the storage area and the two rails, the door panels enter or leave the two rails along the inclines; wherein, the two inclines are formed on tops of the conductive bars.

10. The stacking screen door as claimed in claim 1, further comprising a base, the base mounted on a bottom of a lowermost one of the door panels.

* * * * *